United States Patent [19]

Ohtake et al.

[11] Patent Number: 4,720,733
[45] Date of Patent: Jan. 19, 1988

[54] PHOTOGRAPHIC PRINT SET AND METHOD OF PRODUCING THE SAME

[75] Inventors: Katsumi Ohtake, Tokyo; Kunio Ogura, Miyagi; Tunehiro Koike, Tokyo; Takuya Arai, Tokyo; Kayoko Shioda, Tokyo, all of Japan

[73] Assignee: Fuji Photo Film Co., Ltd., Kanagawa, Japan

[21] Appl. No.: 888,389

[22] Filed: Jul. 21, 1986

[30] Foreign Application Priority Data

Jul. 19, 1985 [JP] Japan ............................ 60-109706[U]
Jul. 19, 1985 [JP] Japan ................................ 60-158333
Jul. 19, 1985 [JP] Japan ................................ 60-158334
Jul. 19, 1985 [JP] Japan ................................ 60-158335

[51] Int. Cl.⁴ ...................... G03B 27/40; G03B 27/50
[52] U.S. Cl. ........................................ 355/50; 355/64; 355/133; 355/77; 40/152
[58] Field of Search ..................... 355/64, 50, 29, 77, 355/41, 72, 133, 28, 39; 40/156, 152

[56] References Cited

U.S. PATENT DOCUMENTS

| | | | |
|---|---|---|---|
| 2,889,036 | 6/1959 | Davies | 40/152 X |
| 2,983,187 | 5/1961 | Bone | 355/28 |
| 3,460,282 | 8/1969 | Swirsky | 40/152 X |
| 3,597,076 | 8/1971 | Hubbard et al. | 355/29 |
| 4,110,923 | 9/1978 | Shore | 40/152 |

Primary Examiner—Richard A. Wintercorn
Attorney, Agent, or Firm—Young & Thompson

[57] ABSTRACT

A photographic print set and method for producing the same. The set comprises a web-like print sheet having a row of picture images. The picture images are printed with equal spaces therebetween on a web-like printing paper from a roll of negative film. The print sheet has perforated lines extending lengthwise of the spaces, which allow the print sheet not only to be alternately oppositely folded thereon so as to provide a coherent folded print set but also to be cut or torn apart therealong so as to provide a set of separate prints.

14 Claims, 6 Drawing Figures

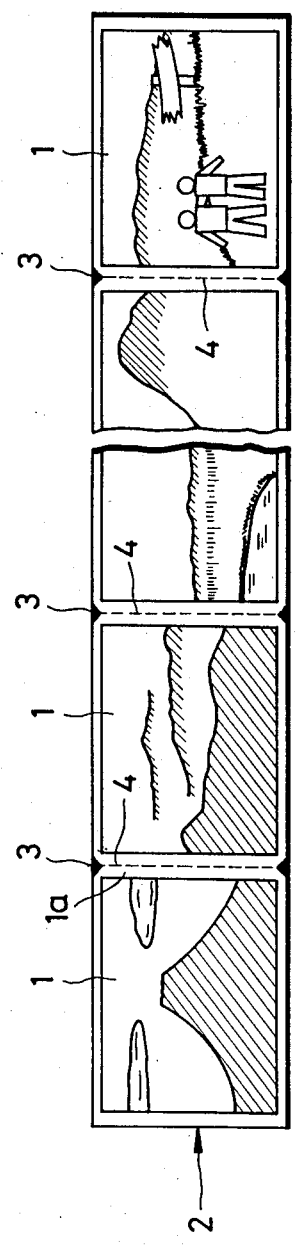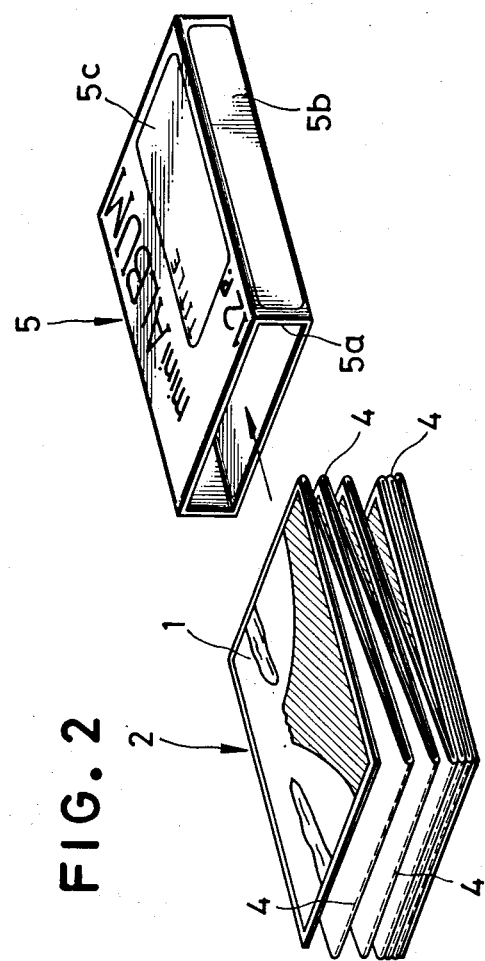
FIG. 1
FIG. 2

PHOTOGRAPHIC PRINT SET AND METHOD OF PRODUCING THE SAME

BACKGROUND OF THE INVENTION

The present invention relates to a photographic print set and to a method for producing the same, which is favorable for filing and storing.

In photo processing services, customers receive a set of separate prints. These prints are made from a web-like printing paper on which a row of positive images have been printed from a roll of negative film. On the other hand, the negative film is cut in several pieces or negative film strips each usually including a predetermined number of frames, for example six frames when a 135-type film is used with a full size format camera. The negative film strips are put in a film jacket to be returned to the customer along with the set of separate prints.

The prints returned to the customer are usually mounted in an album for filing and storing. On the other hand, the negative film strips are either filed in a nega-album or stored in a filing box. However, as it is troublesome to arrange and mount the prints and negative film strips in albums as often as they are received, it often happens that the prints and film slips are left unfiled for a long time. Consequently, when several sets of prints and film strips are left unfiled for a while, they can become mixed up, and filing such mixed up prints and negative film strips in the future is quite troublesome. Especially the negative film strips are sometimes not only damaged but also lost.

Another problem is that it is hard to pick out a particular negative film strip or strips from the collected strips for making special copies.

To help keep prints in order, photo processing shops sometimes file them in a booklet-type photo album when returning them to the customer. Also, for the customer's convenience, it is known to provide an index print sheet on which reduced positive images are printed from the film strips in numerical order. However, neither the booklet-type photo album nor the index print sheet is useful in solving the above problems.

One of the reasons for leaving prints, negative films and index print sheets unfiled for a long time is that there are differences in shape and size between the three: a square print, a long and narrow film strip, and a large sized index print sheet, respectively. Unfortunately, for this reason, the index print sheet, although it seeks to offer customers the convenience of filing the prints, is said in fact to have no useful effect.

Also putting the prints in a booklet-type photo album one by one and when returning them to the customer costs the photo processing shop much labor and time.

OBJECTS OF THE INVENTION

It is, therefore, a principal object of the present invention to provide a photographic print set and method of producing the same, which is favorable for filing and storing photographic prints.

It is another object of the present invention to provide such a set and method which is not burdensome to photo processing shops.

It is a still another object of the invention to provide such a set and method which makes it easy to file and store prints keeping the correspondence between the negative film strips and an index print sheet.

Finally, it is an object of the present invention to provide such a set and method which is compact and handy.

SUMMARY OF THE INVENTION

For achieving the objects described above, in accordance with the present invention, there is provided an improvement in a photographic print set and method of providing the same from a roll of negative film. The present invention resides in making a print sheet having a row of positive images with equal spaces therebetween on a web-like printing paper, forming perforated lines along the spaces which allow cutting apart or otherwise separating the print sheet therealong so as to provide separate prints, and then alternately oppositely folding the print sheet on the perforated lines, thereby providing a coherent and handy print set.

According to the features of the present invention, the print sheet is alternately oppositely folded on every perforated line, or on every second or third perforated line. In the latter case, the folded print sheet is adapted to have its long side in coincidence in length with negative film strips into which a roll of negative film is cut after having made the print sheet therefrom. The print sheet thus folded, alone or together with the negative film strips, is put in a case and returned to the customer as a compact and handy print set. When an index print sheet is provided for the customer's convenience, it is sized to the case and put therein.

From the customers' point of view, the coordinated photographic print set is particularly convenient in applications wherein it is necessary to mount the individual prints in a conventional photo album. This is because the print sheet can be cut apart or otherwise separated into the separate prints along the perforated lines, and because there is a title for the print set and/or captions or notes for each print which can be referred to upon mounting the print in the photo album. Furthermore, in each print set, since the prints and negative film strips and/or index print sheet are enclosed in a case as a coordinated print set, the three are always kept together. This juxtaposition of the three is a considerable advantage in the case wherein it is required to pick out a particular negative film strip or strips for making special copies or for other requirements.

In accordance with the preferred embodiments, there is provided on the print sheet spaces with ruled line images printed between the positive images, in each space a title and/or captions being adapted to be entered. This is quite convenient for filing the prints, even in the future. There is also provided in the print sheet a plain or ruled-line-printed head frame which allows the entry of a title or which allows a title label to be attached.

Upon printing the ruled-line images, there is simultaneously printed in each space a marker image or images at which a perforated line is formed. The perforated line is formed either upon developing the print sheet or after the print sheet has been processed and dried. Perforating the print sheet and folding the same on the perforated lines is therefore automatically effected.

BRIEF DESCRIPTION OF THE DRAWINGS

For a better understanding of the present invention, together with other and further objects, reference is made to the following description, taken in conjunction with the accompanying drawings in which like reference characters denote like parts or elements and wherein:

FIG. 1 is a plan view of the print sheet made, but not yet completed, according to the method of the present invention;

FIG. 2 is an exploded perspective view of a completed print set according to the present invention;

DETAILED DESCRIPTION OF THE INVENTION

Figure 3:
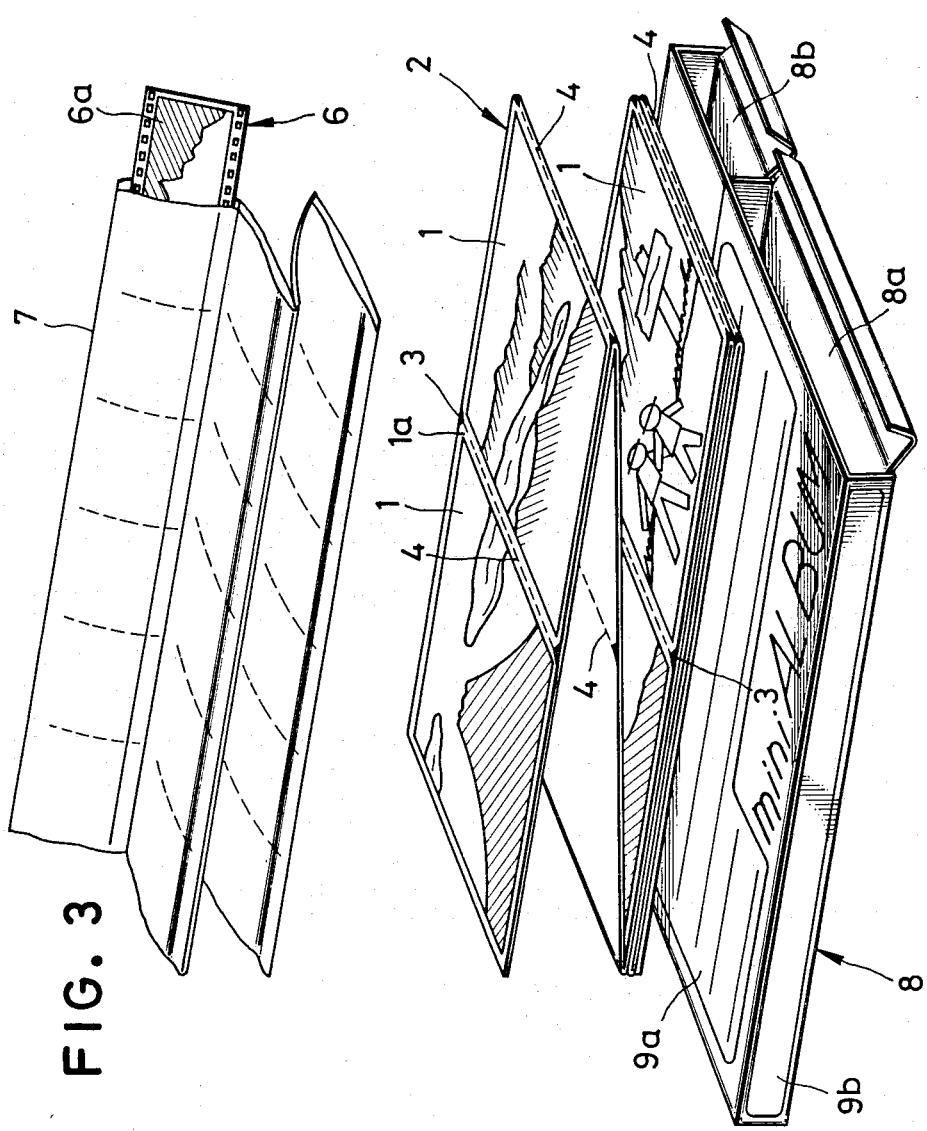
FIG. 3 is an exploded perspective view, similar to FIG. 2, of another completed print set.

Preferred embodiments of the present invention will now be described with reference to the drawings.

In FIGS. 1 and 2 showing an example of a print set made by the method according to the present invention, there is illustrated in FIG. 1 a print sheet 2 on which a number of positive images 1 are printed in a row with equal spaces 1a therebetween. In the print sheet 2, there is also provided within each space 1a a marker image 3 printed at the top upon each positive image 1 by a printer well known per se. The print sheet 2 has its length usually depending on the number of frames of a roll of negative film from which the positive images 1 are printed. In the case of making the print sheet from a 135-type of negative film, there are possibly three variations in length of the resulting print sheet, which is based on the number of exposures of the negative film; 12, 24 and 36 exposures according to the Japanese Industrial standard (JIS).

After having processed the print sheet 2, it is subjected to a stop wherein perforated lines 4 are formed along the spaces 1a at the marker images 3. The perforated lines 4 permit the print sheet 2 to be cut or torn apart therealong in order to provide individually separated positive images or prints if that is desired. However, in photo processing shops, according to the present invention, the print sheet 2 is subjected to a folding step wherein it is alternately oppositely folded on every perforated line 4 as shown in FIG. 2.

Prior to returning the print sheet 2 to the customer, the print sheet 2 thus folded in put into a parallelepipedal handy case 5 for the customer's convenience. The case 5 made of, for example, paper has an open side 5a into which the folded print sheet 2 is inserted and the case 5 is so formed as to prevent the folded print sheet 2 contained therein from coming out accidentally. For this purpose, the case 5 has inner dimensions almost identical to the external dimensions of the coherent folded print sheet 2 so as to hold the folded print sheet 2 firmly therein. For the customer's convenience, the case 5 is provided with a space 5b for a title label on its side wall and an entry space 5c for a title on its top.

From the customer's point of view, the print sheet 2 thus folded and encased can be used as a handy and coherent photo album just as it is, in the manner of a magnetic tape cassette in a case and is favorable for filing and storing. On the other hand, the print sheet 2 can be cut or torn on the perforated lines 4 to separate the individual positive images 1 or prints, so as, for example, to mount them in a conventional photo album at any time.

FIG. 3 shows another example of a print set produced by the method according to the present invention. In this example, a print sheet and a negative film from which the print sheet has been made are encased together in a handy case.

As is well known in the art, a roll of negative film when it is forwarded for simultaneous processing is cut to several film strips 6, each including six frames 6a in full size, or 12 frames in half size, in the case of the 135-type negative film, after having made the print sheet 2 therefrom. The negative film strips 6 thus cut are put in sleeves or pockets of a foldable film jacket 7 well known per se. The film jacket 7 is almost the same in length as the negative film strips 6.

On the other hand, the print sheet 2, which is the same as in FIG. 1, is folded every two positive images on every other perforated line 4. As a result, the folded print sheet 2 becomes almost identical in length to the negative film strips 6, and hence the film jacket 7. The reason is that each print is provided in a special size, which is referred to as a service size, when simultaneous processing is referred and the special-sized print has its width approximately three times of the width of the negative frame.

Prior to returning the print sheet 2 and negative film strips 6 in the film jacket 7 to the customer, they are put in a parallelepipedal case 8 whose inner space is divided by a partition wall into two compartments 8a and 8b for the print sheet 2 and the negative film strips 6, respectively. The case 8 is also provided with an entry space 9a for a title and/or captions on its top and a space 9b for a title label on its side wall.

The case 8 containing the folded print sheet 2 and the negative film strips 6 in the folded film jacket 7 is returned to the customer as a coordinated handy print set. Therefore, from the customer's point of view, the coordinated print set can not only be used as a compact handy photo album just as it is, but also be filed and stored without any loss or confusion, in the manner of an encased magnetic tap cassette. This coordination of print set can make it very easy to mount the prints in a conventional photo album even in the future because the print sheet can be cut or torn on the perforated lines 4 to separate the individual prints at any time. In this print set, although the compartment 8b is provided in the case 8 specially for the negative film strips 6 in the folded film jacket 7, it may be omitted to make the print set more compact. In this case, the film jacket 7 is unfolded and put on top of the folded print sheet 2 for being encased.

Figure 4:
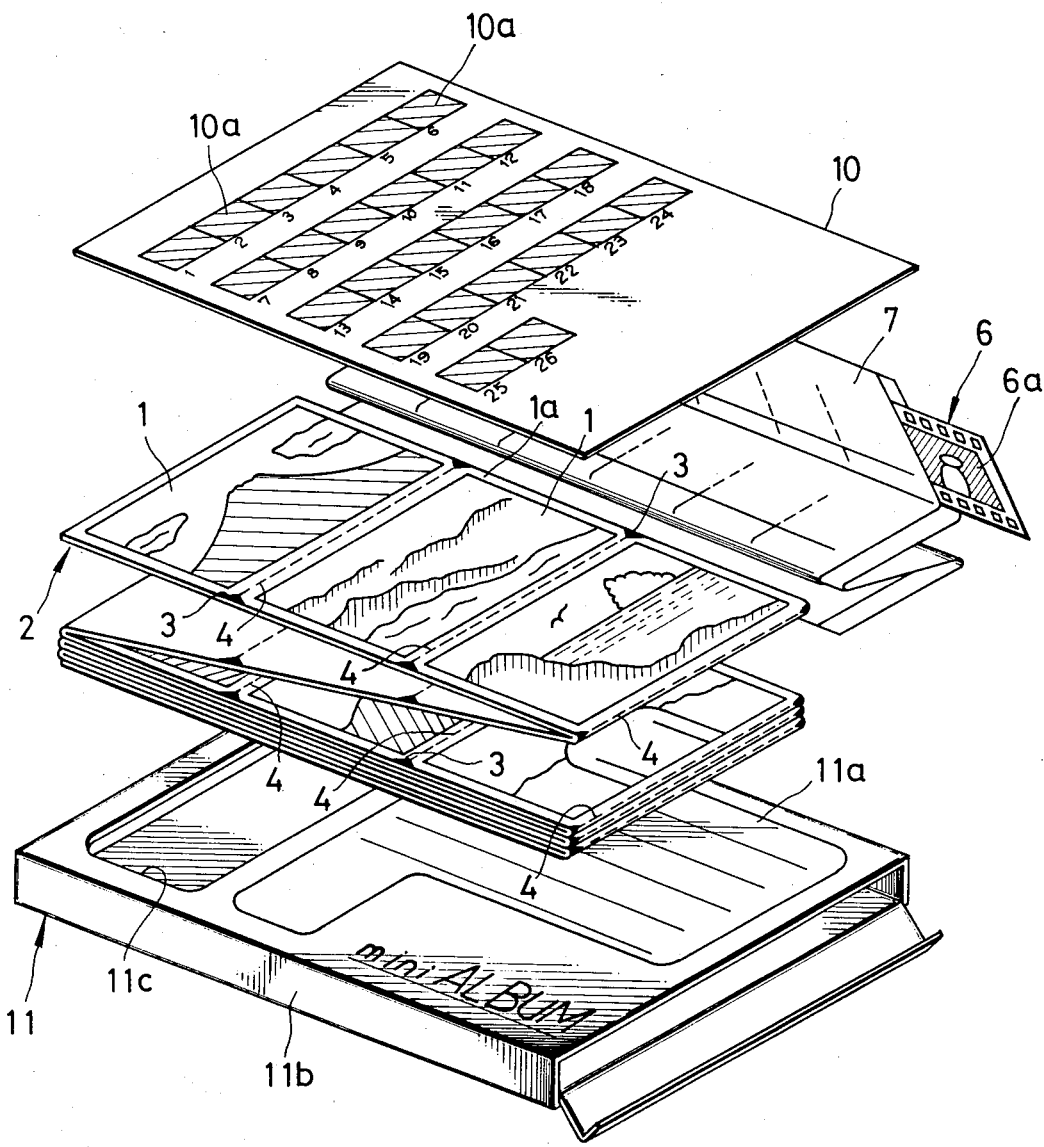
FIG. 4 is an exploded perspective view, similar to FIG. 3, of still another completed print set.

FIG. 4 shows still another example of the print set produced by the method according to the present invention. In this example, the print sheet 2, the negative film strips 5 in the film jacket 7 and an index print sheet 10 are coordinately encased as a compact and handy print set.

The print sheet 2, which is almost the same as in the previous examples except that all the positive images 1 are arranged with their long sides oriented parallel to the lengthwise direction of the print sheet 2, is alternately oppositely folded on every third perforated line 4. On the other hand, after having made the print sheet 2, the negative film is cut to several negative film strips 6 and then put in the sleeves or pockets of the transparent film jacket 7 which is foldable. In the same manner as is well known in the art, the index print sheet 10 is made from the negative film strips 6 arranged in lines in the unfolded transparent film jacket 7. As a result, on the index print sheet 10 is recorded the same number of positive images 10a as on the print sheet 2, and the index positive images 10a are arranged on the index print sheet 10 in the same numerical order as in the print sheet 2.

The index print sheet 10 has a rectangular shape with its long side and short side coinciding in length with the film jacket 7 and the total width of the print sheet 2 and the film jacket 7, respectively. Such an index print sheet 10 can be made easily by varying the magnification of a printer suitable for producing the index positive images 10a.

Prior to returning to the customer the print sheet 2, the index print sheet 10 and the negative film strips 6 held in the film jacket 7, they are in a parallelepipedal case 11 made of, for example, paper such that the folded print sheet 2 and the folded film jacket 7 are arranged side by side and the index print sheet 10 is laid over them. This case 11 is provided on its outer surface with an entry space 9a for a title and/or captions and a space 9b for a title label, and is formed with a view opening to see a few of the index positive images for ascertaining the contents roughly without taking them out.

All the encased materials are returned to the customer as a coordinated print set. This coordination can ensure preventing the negative film strips 6 and the index print sheet 10 from not only being bent and broken during carrying them but also being scattered and lost when they are left unfiled for a while. On the other hand, of course, since the print sheet 2 can be cut or torn on the perforated lines 4 to separate the individual prints at any time, it is quite easy to mount them in a conventional photo album even in the future.

It will be understood that it is permissible to encase the folded print sheet, the negative film strips and the index print sheet in an envelope instead of in the case. In this instance, the folded print sheet 2 itself serves as a protector for keeping the coordinated print set in the envelope in shape.

Figure 5:
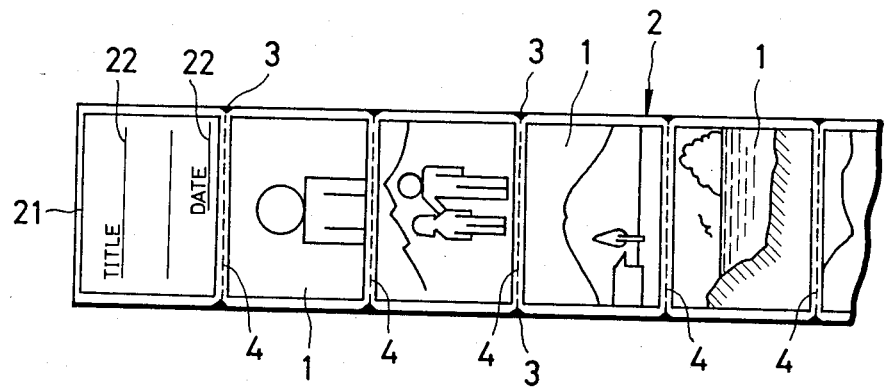
FIG. 5 is a plan view showing a part of an example of the print sheet.

Referring now to FIG. 5 showing a variation of the print sheet 2, there is illustrated a part of the print sheet 2 having a row of positive images 1 which are printed with equal spaces such as the spaces 1a of FIGS. 1 and 3 therebetween. In the same manner as in the above-described examples, there is formed in the print sheet 2 the perforated line 4 along each space 1a at the marker images 3 at the top and bottom. The print sheet 2 has a head frame 21, on which is printed not a picture, but ruled lines 22. These line images are automatically printed at the time of printing the picture images. It should be noted that the head frame may be blank without any positive image. In any case, the head frame 21 is provided as a space in which either a title and/or captions are entered or a title label is attached. For entering a title and/or captions in the head frame 21, the ruled lines 22 are convenient.

The print sheet 2 including the blank head frame 21 is then alternately oppositely folded either on every perforated line 4 as shown in FIG. 2 or, for example, on every third perforated line 4 so as to make the folded print sheet 2 coincide in length with the negative film strips 6 as is shown in FIG. 4.

Figure 6:
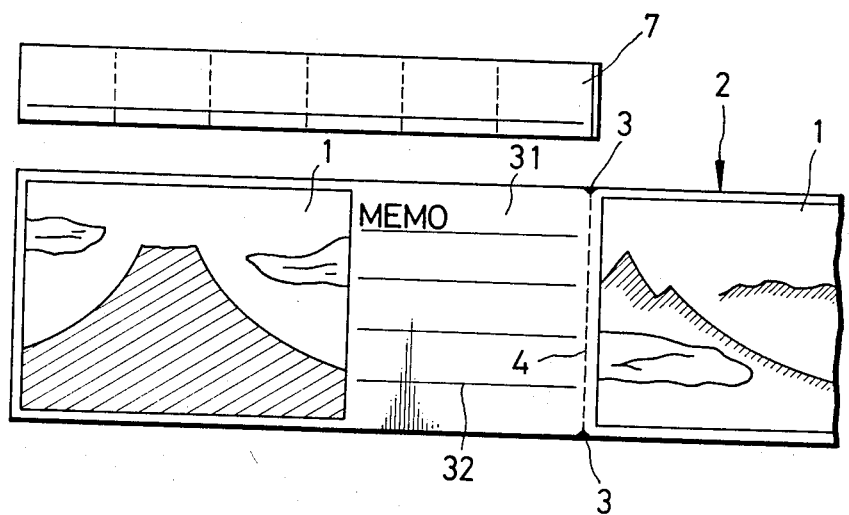
FIG. 6 is an exploded plan view, similar to FIG. 5, showing a part of another example of the print sheet.

Another variation of the print sheet 2 is shown in FIG. 6. The print sheet 2 of which a part is illustrated has a row of positive images 1 which are arranged with their long sides oriented parallel to the lengthwise direction of the print sheet 2. Between the positive images 1 there are provided relatively large spaces 31 each being provided at the top and bottom with marker images 3, with a narrow space between the large space and the subsequent positive image. At the marker images 3 the perforated line 4 is formed. In each large space 31 there are printed a plurality of ruled line images 32 which are helpful for entering a title and/or notes. The ruled line image 32 is automatically printed as well as the marker images 3 upon each picture image. Each print comprising a pair of negative image 1 and entry space 31 is made to coincide in length with the negative film strip 6 or the film jacket 7. For this, the width of the entry space 31 is adjusted in accordance with the size of the positive image 1. Therefore, when folding the print sheet 2 alternately oppositely on every perforated line 4, the film jacket 7 can be coordinately laid on the top of the folded print sheet 2.

As described above, the method of the present invention provides a compact coordinated photographic print set which is quite convenient for customers, for filing and storing photographic prints, their negative film strips and index print sheets. Furthermore, the method does not cost photo processing shops much labor and time.

The present invention can also be applicable to any size of photographic prints.

Although the present invention has been described with particular reference to preferred illustrative examples, various modifications can be effected.

What is claimed is:

1. A method of making a photographic print set from a roll of negative film, which comprises:
   making a print sheet having a row of positive images which are printed with equal spaces therebetween on a web-like printing paper from said negative film;
   forming perforated lines along said spaces which allow separating said print sheet so as to provide separate prints of said positive images; and
   folding said print sheet alternately oppositely on said perforated lines, thereby providing a coherent and handy photographic print set.

2. A method as defined in claim 1, wherein said print sheet is provided with a blank head frame.

3. A method as defined in claim 1, wherein there are printed, in place of one said positive image, ruled line images.

4. A method as defined in claim 2 which further comprises printing an image of a title and/or captions on said print sheet at said head frame.

5. A method as defined in claim 2, wherein there is at least one of a title label and a plain label attached to said print sheet at said head frame.

6. A method as defined in claim 1, which further comprises putting said folded print sheet in a case.

7. A method as defined in claim 6, wherein said case is parallelepipedal with an open side into which said folded print sheet is inserted.

8. A method as defined in claim 7, wherein said case is provided on its outer surface with a space for a title and captions.

9. A method of providing a photographic print set from a roll of negative film, which comprises:
   making a print sheet having a row of positive images which are printed with equal spaces therebetween on a web-like printing paper from said negative film;

forming perforated lines along said spaces which allow separating said print sheet so as to provide separate prints of said positive images;

cutting said negative film to a plurality of negative film strips, each strip including a predetermined number of image frames, and putting said strips separately in a film holder;

folding said print sheet alternately oppositely on said perforated lines so that the folded printed sheet almost coincides in length with said negative film strips; and putting said folded print sheet and negative film strips in said film holder in a case, thereby providing a handy coordinated print set.

10. A method as defined in claim 9, wherein said case has an inner space divided into two compartments for receiving said folded print sheet and film holder separately.

11. A method of providing a photographic print set from a roll of negative film, which comprises:

making a print sheet having a row of positive images which are printed with equal spaces therebetween on a web-like printing paper from said negative film;

forming perforated lines along said spaces which allow separating said print sheet so as to provide separate prints of said positive images;

cutting said negative film to a plurality of negative film strips, each strip including a predetermined number of image frames, and putting said strips in lines in a transparent film holder which is foldable;

making an index print sheet having a plurality of rows of positive images which are printed at a reduced magnification on a rectangular printing paper from said negative film strips so as to make said index print sheet coincide in length with said negative film strips;

folding said print sheet alternately oppositely on said perforated lines so that the folded print sheet coincides in length with said negative film strips; and putting said folded print sheet, negative film strips held in said film holder and said index print sheet together in a case, thereby providing a handy coordinated print set.

12. A method as defined in claim 11, wherein said case is formed with an opening in its top for the observation of at least a few of said reduced positive images of said index print sheet.

13. A photographic print set comprising a web-like print sheet having a row of positive images which are printed with equal spaces therebetween from a roll of negative film, said print sheet being formed within said spaces with perforated lines which allow said print sheet not only to be alternately oppositely folded thereon but also to be separated therealong, said print sheet being alternately oppositely folded on said perforated lines.

14. A photographic print set as defined in claim 13, in combination with a parallelepipedal case having an open side, said folded print sheet being disposed within said case, said case having inner dimensions almost identical to the external dimensions of the folded print sheet so as to hold the folded print sheet firmly therein.

* * * * *